(12) United States Patent
Landauer et al.

(10) Patent No.: US 8,407,187 B2
(45) Date of Patent: Mar. 26, 2013

(54) VALIDATING FILES USING A SLIDING WINDOW TO ACCESS AND CORRELATE RECORDS IN AN ARBITRARILY LARGE DATASET

(75) Inventors: Lawrence G. Landauer, Woodinville, WA (US); Joshua M. Pollock, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 12/816,513

(22) Filed: Jun. 16, 2010

(65) Prior Publication Data
US 2011/0313975 A1 Dec. 22, 2011

(51) Int. Cl.
G06F 7/00 (2006.01)
G06F 17/00 (2006.01)

(52) U.S. Cl. ...................................................... 707/684
(58) Field of Classification Search ........................ None
See application file for complete search history.

(56) References Cited

U.S. PATENT DOCUMENTS

| | | | |
|---|---|---|---|
| 5,802,142 A * | 9/1998 | Browne | 379/28 |
| 6,900,811 B2 | 5/2005 | Sandford | |
| 2007/0283134 A1 | 12/2007 | Smith | |

OTHER PUBLICATIONS

ESPER Reference documentation 2008, EsperTech, 2.1.0, all.*
http://www.jarvana.com/jarvana/view/esper/esper/2.1.0/esper-2.1.0.distribution-zip!/esper-2.1.0/esper/doc/api/index.html, 2007, Jarvana.com, pp. Class IStreamRandomAccess, Class LengthWindowView, Class RelativeAccessByEventNIndexGetter, Class JMXLastEventIndicator.*
How to Detect End of Stream, Nov. 2008, nokia.com, http://www.developer.nokia.com/Community/Discussion/showthread.php?151742-How-to-Detect-End-of-Stream.*
Moore, Rules of ISO 7185 Pascal [Date unknown], standardpascal.com, http://www.standardpascal.org/iso7185rules.html.*
Unknown, Pascal ISO 7185:1990, ISO, http://www.pascal-central.com/docs/iso7185.pdf.*
Chang_Hung Lee et al.: ":Sliding-Window Filtering: An Efficient Algorithm for Incremental Mining"—Published Date: 2001 http://docs.google.com/viewer?a=v&q=cache:m4N1qIhCqAEJ:citeseerx.ist.psu.edu/viewdoc/download%3Fdoi%3D10.1.1.8.2200%26rep%3Drep1%26type%3Dpdf+office+file+validation+%22sliding+window%22+memory&hl=en&pid=bl&srcid=ADGEEShiFSd2r4qUXhSkH8PHd-rF5S3-ydISEeFqYxOwxn-Wq2YDHR4s-jvvgWHr05qy78a3wnxNDLeuvN8yk1wIffcbIPyBF-JJysw0tk2a-apOYD9dqrzrV4VQwOYId5C1MhOPN1&sig=AHIEtbRPYig72uN28w_KR6W49SADijjSoQ , pp. 1-8.
Timothy Vidas: "The Acquisition and Analysis of Random Access Memory"—Published Date: 2006 http://www.informaworld.com/smpp/ftinterface~content=a779634402~fulltext=713240930 , pp. 1.
Mayur Datar et al.:"Maintaining Stream Statistics over Sliding Windows"—Published Date: 2002 http://www-cs-students.stanford.edu/~datar/papers/sicomp_streams.pdf , pp. 1-20.
Data Reorganization—Published Date: Feb. 23, 2006 http://erin.mit.jvu.fi/projects/nds/usrman/node6.html , pp. 1-24.

(Continued)

*Primary Examiner* — Jason Liao
(74) *Attorney, Agent, or Firm* — Merchant & Gould

(57) ABSTRACT

Data records in files may be validated by sequentially accessing the data records while allowing random data access within a sliding window. The data records may also be validated by caching record values. Variable-length record lists in one or more files may be reduced to fixed length record lists while accessing arbitrary record list items.

9 Claims, 6 Drawing Sheets

OTHER PUBLICATIONS

Li, C et al..: "Supporting Efficient Record Linkage for Large Data Sets Using Mapping Techniques"—Published Date: Dec. 1, 2006 http://www.escholarship.org/uc/item/7323w64n?display=all , pp. 1-26.

Amit Ahuja et al.: "A Dynamic Attribute-Based Data Filtering and Recovery"—Published Date: 2009 http://www.springerlink.com/content/01g5385tw2678387/fulltext.pdf , pp. 1-29.

* cited by examiner

US 8,407,187 B2

VALIDATING FILES USING A SLIDING WINDOW TO ACCESS AND CORRELATE RECORDS IN AN ARBITRARILY LARGE DATASET

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Application programs, such as anti-virus and productivity application suites, may be configured to validate files by determining whether a particular file conforms to a specified format when the file is opened on a computer. The file validation process becomes increasingly complicated, however, for file formats which consist of variable-length records such as Binary Interchange File Format ("BIFF") files. Validating BIFF files requires several operations including: comparing values in contiguous records, comparing values in two different noncontiguous records, validating counts of certain types versus the value in a particular field of another record, determining which record a particular offset falls within and using a value in one record to interpret the content within another record.

Current methods for BIFF file validation require a two-phased analysis of the records in a file. During a first phase, each record's position and type and other key data is stored in memory in an array. The second phase then uses the array as a lookup table to help accomplish validation. The current methods for BIFF file validation, however, suffer from a number of drawbacks. One drawback is that the current methods only work efficiently for small and moderate BIFF files. However, many real world BIFF files have hundreds of millions of records. The validation of larger BIFF files using current methods causes the array to use a large amount of memory which slows down counting and searching operations associated with the array. Another drawback with the current methods is that, in some cases, the memory allocation requirements for validating larger BIFF files is so large, some computer systems may run out of memory before the file validation process is completed. It is with respect to these considerations and others that the various embodiments of the present invention have been made.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are provided for validating files by sequentially accessing data records while allowing random data access within a sliding window, validating files by caching record values and reducing a variable-length record list to a fixed length record list while accessing arbitrary record list items. In accordance with an embodiment, a computer may be utilized to initialize variables representing multiple records in a file. The records may represent a window including a first record, a current record, a previous record, a next record, and a record which is two records prior to the current record. The computer may further be utilized to read the current record from the file, copy the current record to the first record for validation, copy the current record to the previous record and the next record to the current record for validation, determine whether all of the plurality of records in the file have been validated and, if not, determine whether another record is present in the file. The computer may further be utilized to read another record into the next record, validate the current record and copy the previous record to the record which is two records prior to the current record.

In accordance with another embodiment, a computer may be utilized to determine whether a record type for a current record in a file is equal to a first record type and, if so, set a cached count for the current record to zero, cache one or more values in the current record and process the current record to validate it. Upon determining that the record type for the current record in the file is equal to another record type, the computer may be utilized to increment the cached count for the current record and process the current record to validate it.

In accordance with another embodiment, a computer may be utilized to build a cache of record contexts for every nth record in a list of variable-length records in a file according to a predetermined frequency. The computer may be further utilized to maintain total cache size for the variable-length records at a fixed value.

These and other features and advantages will be apparent from a reading of the following detailed description and a review of the associated drawings. It is to be understood that both the foregoing general description and the following detailed description are illustrative only and are not restrictive of the invention as claimed.

DETAILED DESCRIPTION

Embodiments are provided for validating files by sequentially accessing data records while allowing random data access within a sliding window, validating files by caching record values and reducing a variable-length record list to a fixed length record list while accessing arbitrary record list items. In accordance with an embodiment, a computer may be utilized to initialize variables representing multiple records in a file. The records may represent a window including a first record, a current record, a previous record, a next record, and a record which is two records prior to the current record. The computer may further be utilized to read the current record from the file, copy the current record to the first record for validation, copy the current record to the previous record and the next record to the current record for validation, determine whether all of the plurality of records in the file have been validated and, if not, determine whether another record is present in the file. The computer may further be utilized to read another record into the next record, validate the current record and copy the previous record to the record which is two records prior to the current record.

In accordance with another embodiment, a computer may be utilized to determine whether a record type for a current record in a file is equal to a first record type and, if so, set a cached count for the current record to zero, cache one or more values in the current record and process the current record to validate it. Upon determining that the record type for the current record in the file is equal to another record type, the computer may be utilized to increment the cached count for the current record and process the current record to validate it.

In accordance with another embodiment, a computer may be utilized to build a cache of record contexts for every nth record in a list of variable-length records in a file according to a predetermined frequency. The computer may be further utilized to maintain total cache size for the variable-length records at a fixed value.

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense, and the scope of the present invention is defined by the appended claims and their equivalents.

Figure 1:
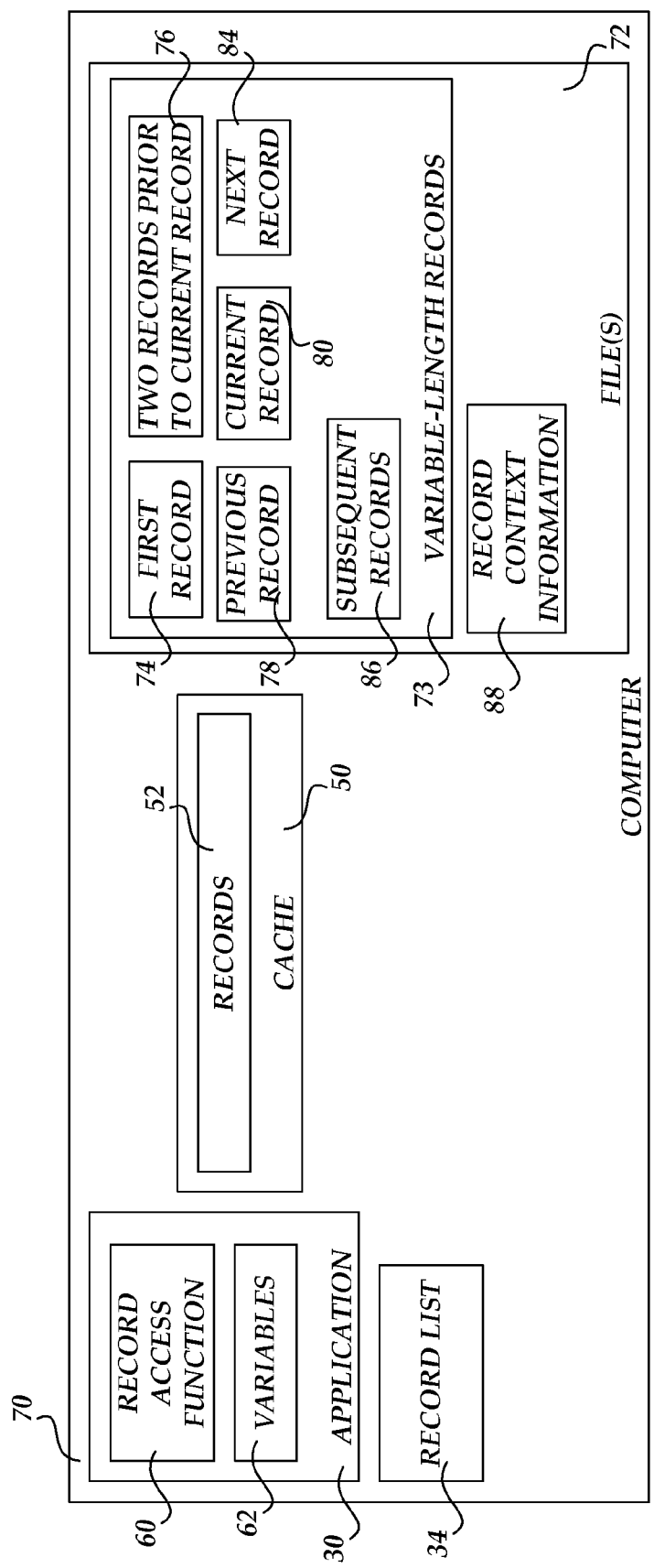
FIG. 1 is a block diagram illustrating a computer architecture for validating files by sequentially accessing data records while allowing random data access within a sliding window, validating files by caching record values and reducing a variable-length record list to a fixed length record list while accessing arbitrary record list items, in accordance with various embodiments.

Referring now to the drawings, in which like numerals represent like elements through the several figures, various aspects of the present invention will be described. FIG. 1 is a block diagram illustrating a computer architecture for validating files by sequentially accessing data records while allowing random data access within a sliding window, validating files by caching record values and reducing a variable-length record list to a fixed length record list while accessing arbitrary record list items, in accordance with various embodiments. The computer architecture includes a computer 70 which includes an application 30, a record list 34, a cache 50 and one or more files 72. As will be described in greater detail below with respect to FIGS. 3-6, the application 30 may be configured to validate files by sequentially accessing data records while allowing random data access within a sliding window, validate files by caching record values and reduce a variable-length record list to a fixed length record list while accessing arbitrary record list items. The application 30 may include a record access function 60 and variables 62. In accordance with an embodiment, the application 30 may utilize the record access function 60 to read records stored in the one or more files 72 given the record context information 88. Various operations associated with the record access function 60 will be described in greater detail below with respect to FIG. 3. The variables 62 may represent various records stored in the one or more files 72. The application 30 may initialize the variables 62 in performing a series of operations for validating files by sequentially accessing data records while allowing random data access within a sliding window, as will be described in greater detail below with respect to FIG. 3. In accordance with an embodiment, the application 30 may comprise the FOREFRONT antivirus application security product from MICROSOFT CORPORATION of Redmond, Wash. In accordance with another embodiment, the application 30 may comprise the OFFICE application program suite, which may further include the EXCEL spreadsheet application program, from MICROSOFT CORPORATION. It should be appreciated, however, that other antivirus or productivity/application programs from MICROSOFT CORPORATION as well as from other manufacturers may be utilized in accordance with the various embodiments described herein.

The record list 34 in the computer 70 of the computer architecture of FIG. 1 may comprise a list of the records stored in the one or more files 72. The cache 50 may include cached records 52 and may be utilized by the application 30 to validate the one or more files 72 as well as to reduce a variable-length record list to a fixed length record list while accessing arbitrary record list items, as will be described in greater detail below with respect to FIG. 4.

The one or more files 72 in the computer 70 of the computer architecture of FIG. 1 may comprise one or more spreadsheet application workbook files. In accordance with an embodiment, the one or more files 72 may be formatted according to the Binary Interchange File Format ("BIFF"). Each of the one or more files 72 may include a series of sequential variable-length records 73 and record context information 88. The variable-length records 73 may include a first record 74, a current record 80, a previous record 78 (i.e., previous with respect to the current record 80), a record which is two records prior to the current record 76, a next record 84 (i.e., with respect to the current record 80) and subsequent records 86 (i.e., with respect to the current record 80). The record context information 88 may be utilized by the record access function 60 to read records from the one or more files 72 (as will be described in greater detail below with respect to FIG. 3). It should be understood that in accordance with various embodiments, at least some of the record context information 88 is not contained within the one or more files 72 but rather may be inferred from the one or more files 72. Inferred record context information may include, without limitation, information for correlating groups of records and the computed position of a next record to be read when reading records from the one or more files 72.

Exemplary Operating Environment

Figure 2:
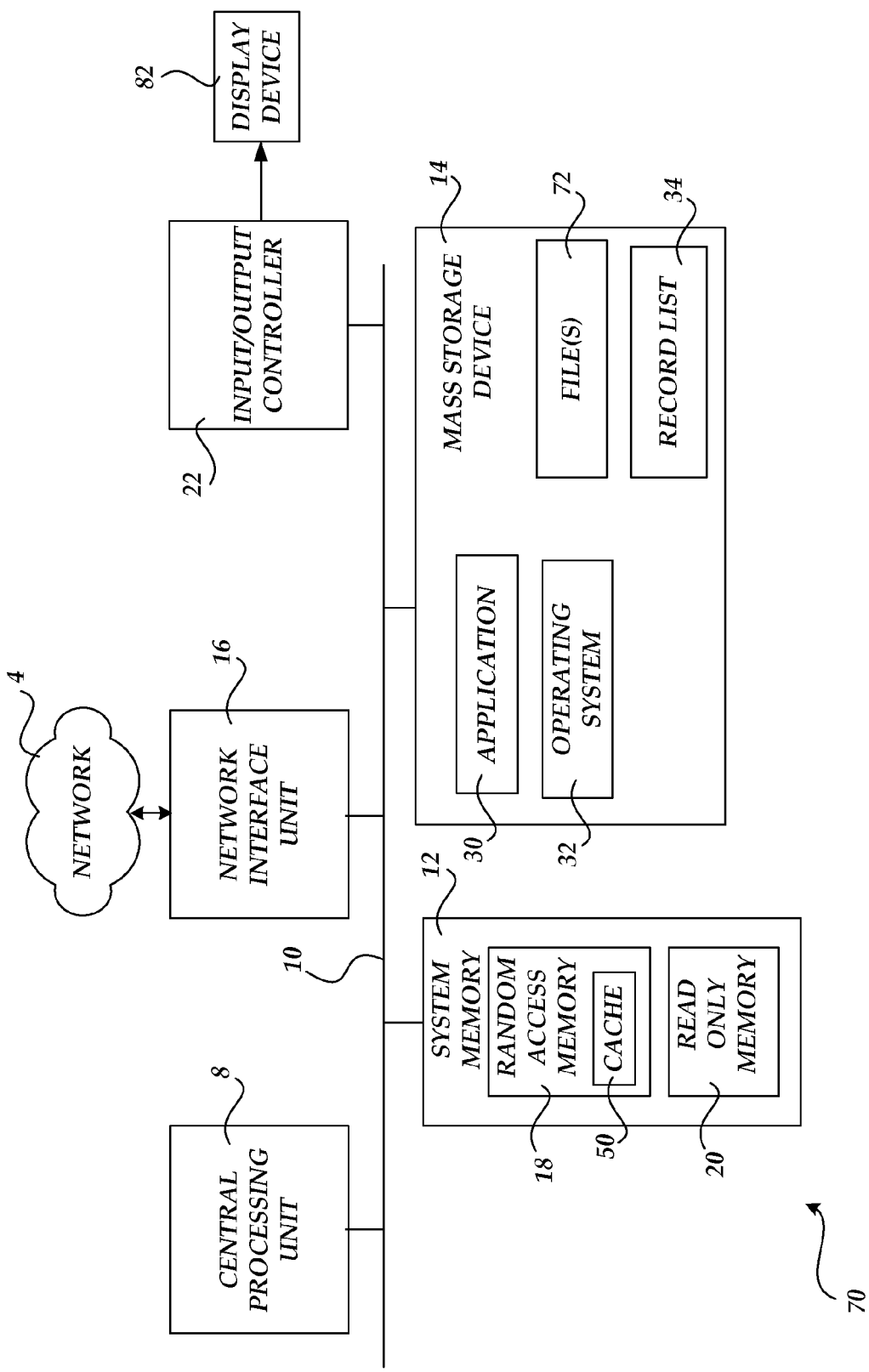
FIG. 2 is a block diagram illustrating a computing environment for validating files by sequentially accessing data records while allowing random data access within a sliding window, validating files by caching record values and reducing a variable-length record list to a fixed length record list while accessing arbitrary record list items, in accordance with various embodiments.

Referring now to FIG. 2, the following discussion is intended to provide a brief, general description of a suitable computing environment in which various illustrative embodiments may be implemented. While various embodiments will be described in the general context of program modules that execute in conjunction with program modules that run on an operating system on a computer, those skilled in the art will recognize that the various embodiments may also be implemented in combination with other types of computer systems and program modules.

Generally, program modules include routines, programs, components, data structures, and other types of structures that perform particular tasks or implement particular abstract data types. Moreover, those skilled in the art will appreciate that the various embodiments may be practiced with a number of computer system configurations, including hand-held devices, multiprocessor systems, microprocessor-based or programmable consumer electronics, minicomputers, mainframe computers, and the like. The various embodiments may also be practiced in distributed computing environments where tasks are performed by remote processing devices that are linked through a communications network. In a distributed computing environment, program modules may be located in both local and remote memory storage devices.

FIG. 2 shows the computer 70 which may comprise any type of computer, including a client or server computer, capable of executing one or more application programs. The computer 70 includes at least one central processing unit 8 ("CPU"), a system memory 12, including a random access memory 18 ("RAM"), for storing the cache 50, and a read-only memory ("ROM") 20, and a system bus 10 that couples the memory to the CPU 8. It should be appreciated that the cache 50 described as being stored in the RAM 18 may be stored in any other computer storage medium known to those skilled in the art. A basic input/output system containing the basic routines that help to transfer information between elements within the computer, such as during startup, is stored in the ROM 20.

The computer 70 may further include a mass storage device 14 for storing the application 30, an operating system 32, the record list 34 and the one or more files 72. In accordance with various embodiments, the operating system 32 may be suitable for controlling the operation of a networked computer, such as the WINDOWS operating systems from MICROSOFT CORPORATION of Redmond, Wash. The mass storage device 14 is connected to the CPU 8 through a mass storage controller (not shown) connected to the bus 10. The mass storage device 14 and its associated computer-readable media provide non-volatile storage for the computer 70. Although the description of computer-readable media contained herein refers to a mass storage device, such as a hard disk or CD-ROM drive, it should be appreciated by those skilled in the art that computer-readable media can be any available media that can be accessed or utilized by the computer 70. By way of example, and not limitation, computer-readable media may comprise computer storage media and communication media.

Computer storage media includes volatile and non-volatile, removable and non-removable hardware storage media implemented in any physical method or technology for the storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, which can be used to store the desired information and which can be accessed by the computer 70.

Communication media includes any information delivery media. For example, in accordance with an embodiment, communication media may include a wired network or direct-wired connection. In accordance with another embodiment, communication media may include wireless media such as acoustic, RF, infrared, and other wireless media. In accordance with yet another embodiment, communication media may include computer-readable instructions, data structures, program modules or other data in a modulated data signal such as a carrier wave or other transport mechanism. The term "modulated data signal" means a signal that has one or more of its characteristics set or changed in such a manner as to encode information in the signal. Combinations of any of the above should also be included within the scope of computer-readable media. Computer-readable media may also be referred to as a computer program product.

According to various embodiments, the computer 70 may operate in a networked environment using logical connections to remote computers through a network 4 which may comprise, for example, a local network or a wide area network (e.g., the Internet). The computer 70 may connect to the network 4 through a network interface unit 16 connected to the bus 10. It should be appreciated that the network interface unit 16 may also be utilized to connect to other types of networks and remote computing systems. The computer 70 may also include an input/output controller 22 for receiving and processing input from a number of input types, including a keyboard, mouse, pen, stylus, finger, voice input, and/or other means. Similarly, an input/output controller 22 may provide output to a display device 82, a printer, or other type of output device. Additionally, a touch screen can serve as an input and an output mechanism.

Figure 3:
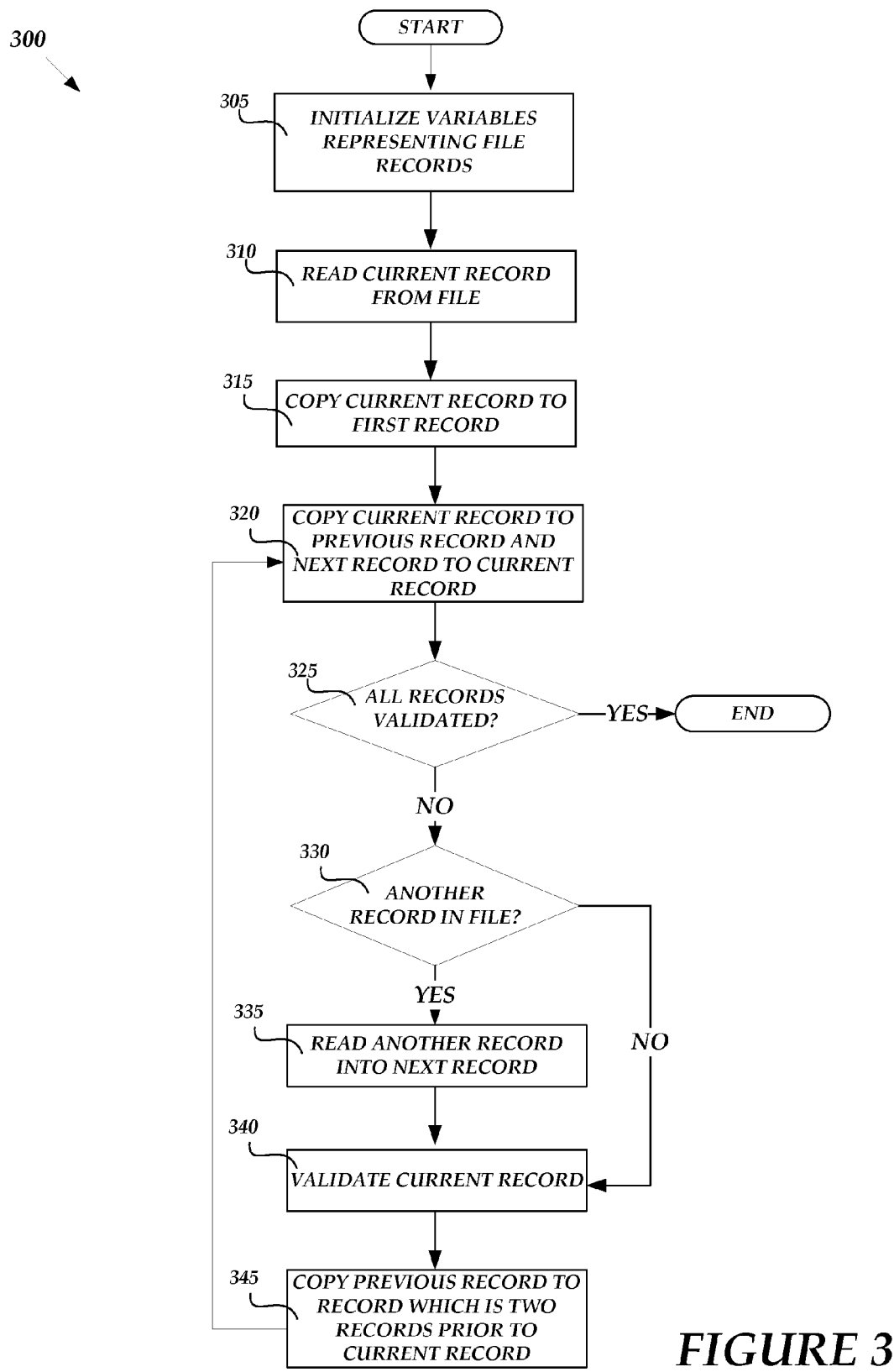
FIG. 3 is a flow diagram illustrating a routine for validating files by sequentially accessing data records while allowing random data access within a sliding window, in accordance with various embodiments.

FIG. 3 is a flow diagram illustrating a routine 300 for validating files by sequentially accessing data records while allowing random data access within a sliding window, in accordance with various embodiments. When reading the discussion of the routines presented herein, it should be appreciated that the logical operations of various embodiments of the present invention are implemented (1) as a sequence of computer implemented acts or program modules running on a computing system and/or (2) as interconnected machine logical circuits or circuit modules within the computing system. The implementation is a matter of choice dependent on the performance requirements of the computing system implementing the invention. Accordingly, the logical operations illustrated in FIGS. 3-6 and making up the various embodiments described herein are referred to variously as operations, structural devices, acts or modules. It will be recognized by one skilled in the art that these operations, structural devices, acts and modules may be implemented in software, in firmware, in special purpose digital logical, and any combination thereof without deviating from the spirit and scope of the present invention as recited within the claims set forth herein.

The routine 300 begins at operation 305, where the application 30 executing on the computer 70 initializes the variables 62 representing the variable-length records 73 stored in the one or files 72. In particular, the first record 74, the current record 80, the previous record 78, the next record 84, and the two records prior to the current record 76 may comprise a sliding window which is utilized by the application 30 to allow random data access when validating the one or more files 72. In accordance with an embodiment, the aforementioned records may be stored in a small array as follows:

```
// m_rgRec[0] is always the first record of the list
// m_rgRec[1] is always two records ago
// m_rgRec[2] is always the previous record
// m_rgRec[3] is always the current record
// m_rgRec[4] is the next record
PosAll m_rgRec[5];
```

For code readability, the following macros may then be used:

```
#define RecFirst m_rgRec[0]
#define Rec2Prev m_rgRec[1]
#define RecPrev m_rgRec[2]
#define RecCurr m_rgRec[3]
#define RecNext m_rgRec[4]
```

It should be understood that the structural definitions utilized in the array described above, as well as further structural definitions which will be utilized in the algorithms described below with respect to the discussion of FIGS. 5-6, may be represented in a manner consistent with C/C++ programming, although other programming languages known to those skilled in the art, may also be utilized without departing from the scope of the embodiments discussed herein.

From operation 305, the routine 300 continues to operation 310 where the application 30 executing on the computer 70 reads the current record 80 from the one or more files 72. For example, the application 30 may call the record access function 60 to read the current record 80 based on the record context information 88. In particular, the application 30 may call the record access function 60 to: receive the record context information 88 associated with the current record 80, read the current record 80 based on the record context information 88, update the record context information 88 and read the next record 84 based on the record context information 88. In particular, the record access function 60 may comprise a function configured to read any record in a file given context information. In accordance with an embodiment, the record access function 60 may be represented as HRESULT HrReadRecord(PosType &pt, PosContext &cxt). It should be understood that, in accordance with the present embodiment, the record access function 60 does not perform any caching of records and makes no interpretation of any data contained therein. Furthermore, record access function 60 may be configured to update context values (e.g., cxt values) so that another call to the record access function 60 (by the application 30) will read the following or next record. It should be appreciated that by performing in the aforementioned manner, the record access function 60 may be called repeatedly to sequentially read records (e.g., sequential access) and context values may be used to read any record from a file (e.g., random data access), based not on an index, but on context.

From operation 310, the routine 300 continues to operation 315 where the application 30 executing on the computer 70 copies the current record 80 to the first record 74.

From operation 315, the routine 300 continues to operation 320 where the application 30 executing on the computer 70 copies the current record 80 to the previous record 78 and also copies the next record 84 to the current record 80.

From operation 320, the routine 300 continues to operation 325 where the application 30 executing on the computer 70 determines whether all of the records in the one or more files 72 have been validated. If so, then the routine 300 then ends. If not, then the routine 300 continues to operation 330.

At operation 330, the application 30 executing on the computer 70 determines whether another record exists within the one or more files 72. If so, then the routine 300 continues to operation 335. If not, then the routine 300 branches to operation 340.

At operation 335, the application 30 executing on the computer 70 calls the record access function 60 to read another record into the next record 84. From operation 335, the routine 300 continues to operation 340.

At operation 340, the application 30 executing on the computer 70 validates the current record 80. In particular, the application 30 may validate the current record 80 by validating a type, size, and position associated with the current record 80 in the one or more files 72.

From operation 340, the routine 300 continues to operation 345 where the application 30 executing on the computer 70 copies the previous record 78 to the record which is two records prior to the current record 76. From operation 345, the routine 300 then returns to operation 320 where the application 30 executing on the computer 70 copies the current record 80 to the previous record 78 and also copies the next record 84 to the current record 80. From operation 320, the routine 300 then continues a subsequent time to operation 325 where the application 30 executing on the computer 70 again determines whether all of the records in the one or more files 72 have been validated. It should be appreciated that the routine 300 and/or the operations 320, 325, 330, 335, 340, and 345 may be iteratively or recursively repeated until all of the records in the one or more files 72 have been validated.

Figure 4:
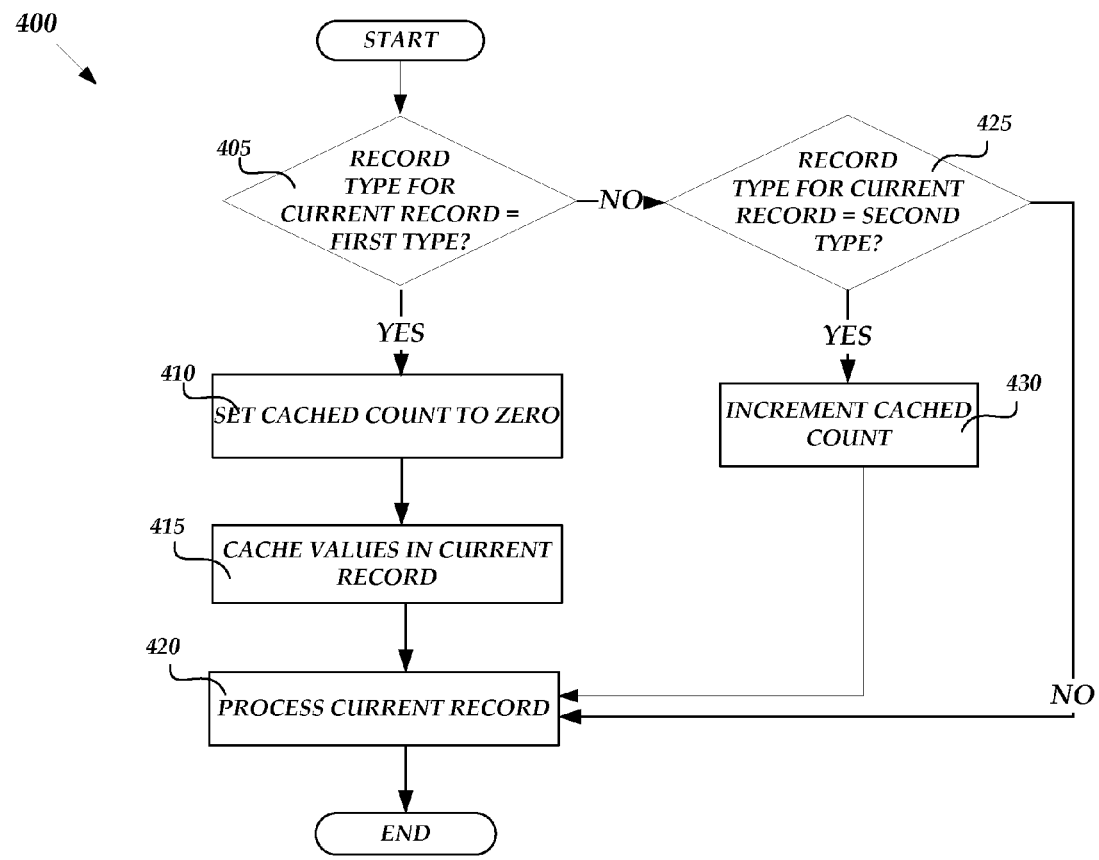
FIG. 4 is a flow diagram illustrating a routine for validating files by caching record values, in accordance with various embodiments.

FIG. 4 is a flow diagram illustrating a routine 400 for validating files by caching record values, in accordance with various embodiments. The routine 400 begins at operation 405 where the application 30 executing on the computer 70 determines whether a record type for the current record 80 is a first type of record among multiple record types utilized in the one or more files 72. For example, in accordance with an embodiment, the application 30 may be configured to determine whether the current record 80 is an EXCEL SXVIEW variable-length record in a spreadsheet application workbook file. If, at operation 405, the application 30 determines that the record type for the current record 80 is a first type of record, then the routine 400 continues to operation 410. If, at operation 405, the application 30 determines that the record type for the current record 80 is not a first type of record, then the routine 400 branches to operation 425.

At operation 410 where the application 30 executing on the computer 70 sets a cached count for a second type of record to zero in the cache 50. For example, when the first type of record is an EXCEL SXVIEW record and a second type of record is an EXCEL SXLI record, the application 30 may be configured to set a cached count for the SXLI record (e.g., SXLICount) to zero.

From operation 410, the routine 400 continues to operation 415 where the application 30 executing on the computer 70 caches values in the current record 80. In particular, in accordance with an embodiment, the application 30 may cache row and column values associated with a record in a spreadsheet application workbook file. For example, for an EXCEL SXVIEW (e.g., rtSxView) record, the application 30 may be configured to cache cRw or cCol values from the record. It should be understood, in accordance with various embodiments, that the application 30 may be configured to cache values as records are read and then use those cached values as needed. It should further be understood that the process of reading and validating data using cached values may be done sequentially. Thus, it should be appreciated that this allows for a prior record validation to store a value or a computation based on a value, the result of which may be used later during validation. In accordance with various embodiments, there may be several types of caches which may be utilized in conjunction with the routine 400 including, but not limited to:
1. Incrementing Counters: Values which start at a predefined value and increment with each instance where a particular condition is true as validation progresses;
2. Decrementing Counters: Values which start at a calculated value and decrement with each instance where a particular condition is true as validation progresses;
3. Values: A place to remember the value of a particular part of a record (field); and
4. Flags: A way to remember whether a particular condition was true or not.

From operation 415, the routine 400 continues to operation 420 where the application 30 executing on the computer 70 processes the current record 80 so that the current record 80 may be validated. From operation 420, the routine 400 then ends.

At operation 425, the application 30 executing on the computer 70 determines whether a record type for the current record 80 is another type of record among multiple record types utilized in the one or more files 72. For example, in accordance with an embodiment, the application 30 may be configured, after determining that the current record is not an SXVIEW record at operation 405, to determine whether the current record 80 is an EXCEL SXLI (e.g., rtSxli) variable-length record in a spreadsheet application workbook file. If, at operation 425, the application 30 determines that the record type for the current record 80 is second type of record (e.g., an SXLI record), then the routine 400 continues to operation 430. If, at operation 425, the application 30 determines that the record type for the current record 80 is another type of record (e.g., the current record 80 is neither an SXVIEW record nor an SXLI record), then the routine 400 returns to operation 420.

At operation 430, the application 30 executing on the computer 70 increments a cached count for the second type of record. For example, if the second type of record is an EXCEL SXLI record, the application 30 may be configured to increment a cached count (e.g., SXLICount) for the SXLI record. From operation 430, the routine 400 returns to operation 420.

With respect to the routine 400 of FIG. 4 discussed above, those skilled in the art should appreciate that combinations of the counters in the aforementioned cache types, plus their attributes (such as whether they are allowed to increment or decrement past a fixed value), may be utilized in accordance with various embodiments. It should further be appreciated that by utilizing the aforementioned caches, the need of the validation process for a current record to actively go and access prior records, is effectively eliminated. For example, for when validating an rtSxview record in an EXCEL spreadsheet application workbook file, the application 30 may be configured to cache cRw, cCol values to reference here: SetRtSxviewcRw and SetRtSxViewcCol routines, respectively. Furthermore, the validation may also reset the count of rtSxli records to zero (i.e., SetcrtSxli(0)).

Figure 5:
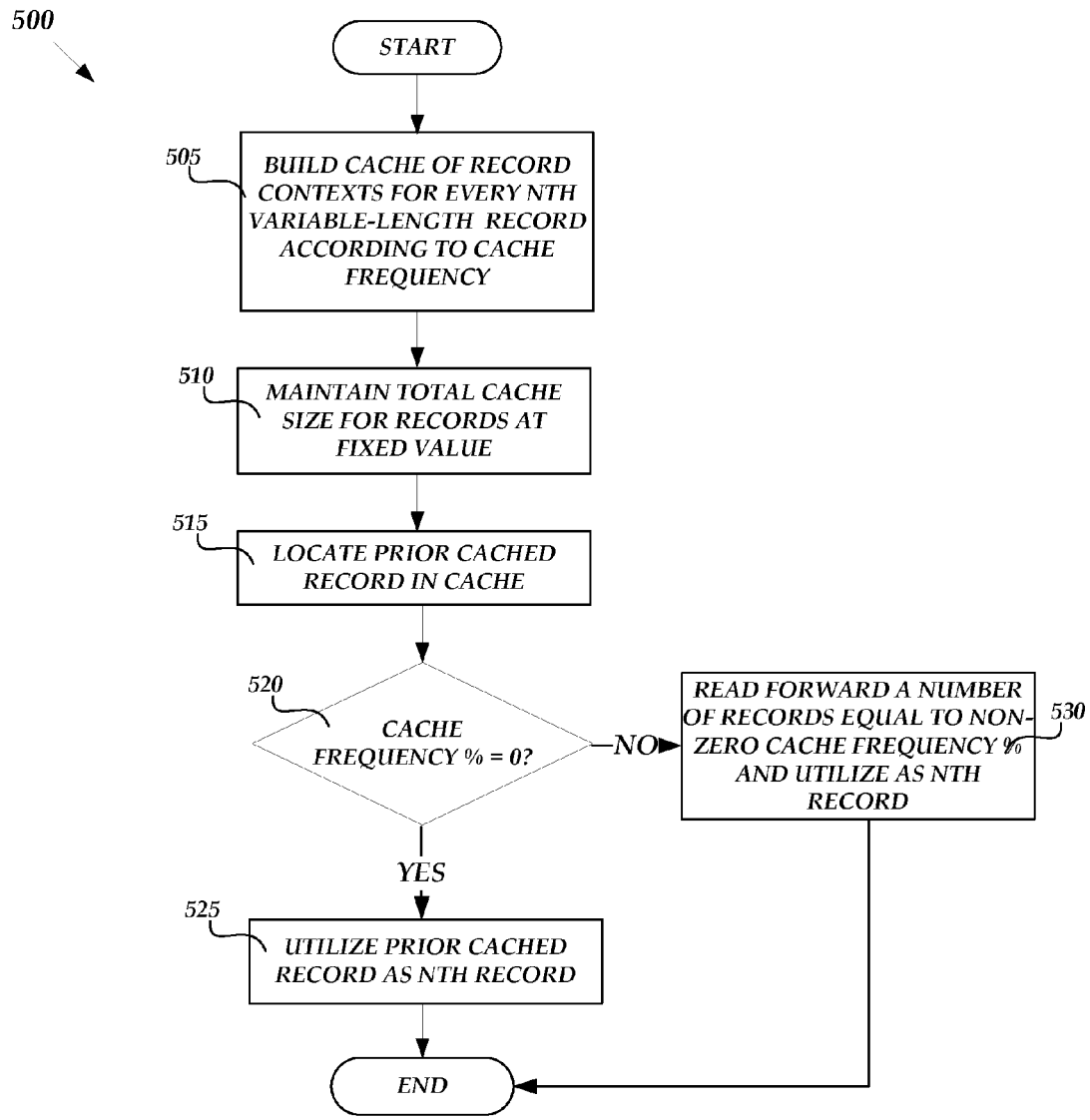
FIG. 5 is a flow diagram illustrating a routine for reducing a variable-length record list to a fixed length record list while accessing arbitrary record list items, in accordance with an embodiment.

FIG. 5 is a flow diagram illustrating a routine 500 for reducing a variable-length record list to a fixed length record list while accessing arbitrary record list items, in accordance with an embodiment. It should be understood that the routines discussed herein with respect to FIG. 5 as well as FIG. 6 (below), may cover special validation cases in which arbitrary record access is needed (e.g., where one record references another record or field as an offset). The routine 500 begins at operation 505 where the application 30 executing on the computer 70 may be utilized to build a cache of record contexts for every Nth variable-length record (e.g., the records 52 in the cache 50) according to a cache frequency. In particular, each Nth record may be identified by a cache frequency determined for the cache as shown by the following illustrative computer program code:

```
if (RecordIndex % cacheFreq == 0 && cCacheEntries >= cacheSize)
{
    for (i = 1; i * 2 < cacheSize; i++)
        move cached item i*2 to i
    cacheFreq *= 2
    cCacheEntries /= 2
}
if (RecordIndex % cacheFreq == 0)
{
    remember the current entry
    cCacheEntries++
}
```

From operation 505, the routine 500 continues to operation 510 where the application 30 executing on the computer 70 maintains a total cache size (for records) for the cache built at operation 505, at a fixed value. In particular, the application 30 may build the cache 50 for every Nth record such that the total cache size remains constant (as shown in the illustrative computer program code discussed above at operation 505).

From operation 510, the routine 500 continues to operation 515 where the application 30 executing on the computer 70 may be utilized to locate a prior cached record in the cache 50. In accordance with an embodiment, the prior cached record may be determined by the expression "cache record N/cacheFreq," where the cache record N is a record in the cache 50 and the cacheFreq is the frequency determined for the cache 50 (as discussed above at operation 505). It should be understood that the application 30 may be utilized to locate a prior cached record as part of a lookup operation to identify an Nth record in the cache 50. In accordance with an embodiment, the identification of the Nth record may be implemented by an algorithm which will be described in detail below in the discussion of operations 515-530.

From operation 515, the routine 500 continues to operation 520 where the application 30 executing on the computer 70 determines whether a cache frequency percentage for the cache 50 is equal to zero. In accordance with an embodiment, the cache frequency may be represented by the expression: N % cacheFreq (where % represents the mathematical integer modulus operator and not a percentage, which is instead a result of the expression as a whole). If, at operation 520, the application 30 determines that the cache frequency percentage is equal to zero, then the routine 500 continues to operation 525. If, at operation 520, the application 30 determines that the cache frequency percentage is not equal to zero, then the routine 500 branches to operation 530.

At operation 525, the application 30 executing on the computer 70 utilizes the prior cached record (located at operation 515) as the Nth record. From operation 525, the routine 500 then ends.

At operation 530, the application 30 executing on the computer 70 reads forward (in the file(s) 72) a number of variable-length records, where the number is equal to the cache frequency percentage (i.e., the non-zero cache frequency percentage) determined at operation 520, and utilizes that record as the Nth record. From operation 530, the routine 500 then ends. In accordance with an embodiment, the cache lookup operations 515-530 may be implemented by the following illustrative computer program code:

```
PosAll paRec;
memcpy(&paRec, &m_rgpaCache[(ulID−1)/m_dwCacheFreq],
    sizeof(paRec));
int i = (ulID − 1) % m_dwCacheFreq;
if (i == 0)
    pAddr->GKAddressStream.pos.QuadPart =
    paRec.rec.pos.QuadPart;
else
    {
    while (i > 0 && (SUCCEEDED(hr)))
        {
        hr = HrReadRecord(paRec.rec, paRec.cxt);
        i--;
        }
    if(SUCCEEDED(hr))
        pAddr->GKAddressStream.pos.QuadPart =
        paRec.cxt.pos.QuadPart;
    }
```

From routine 530, the routine 500 then ends.

Figure 6:
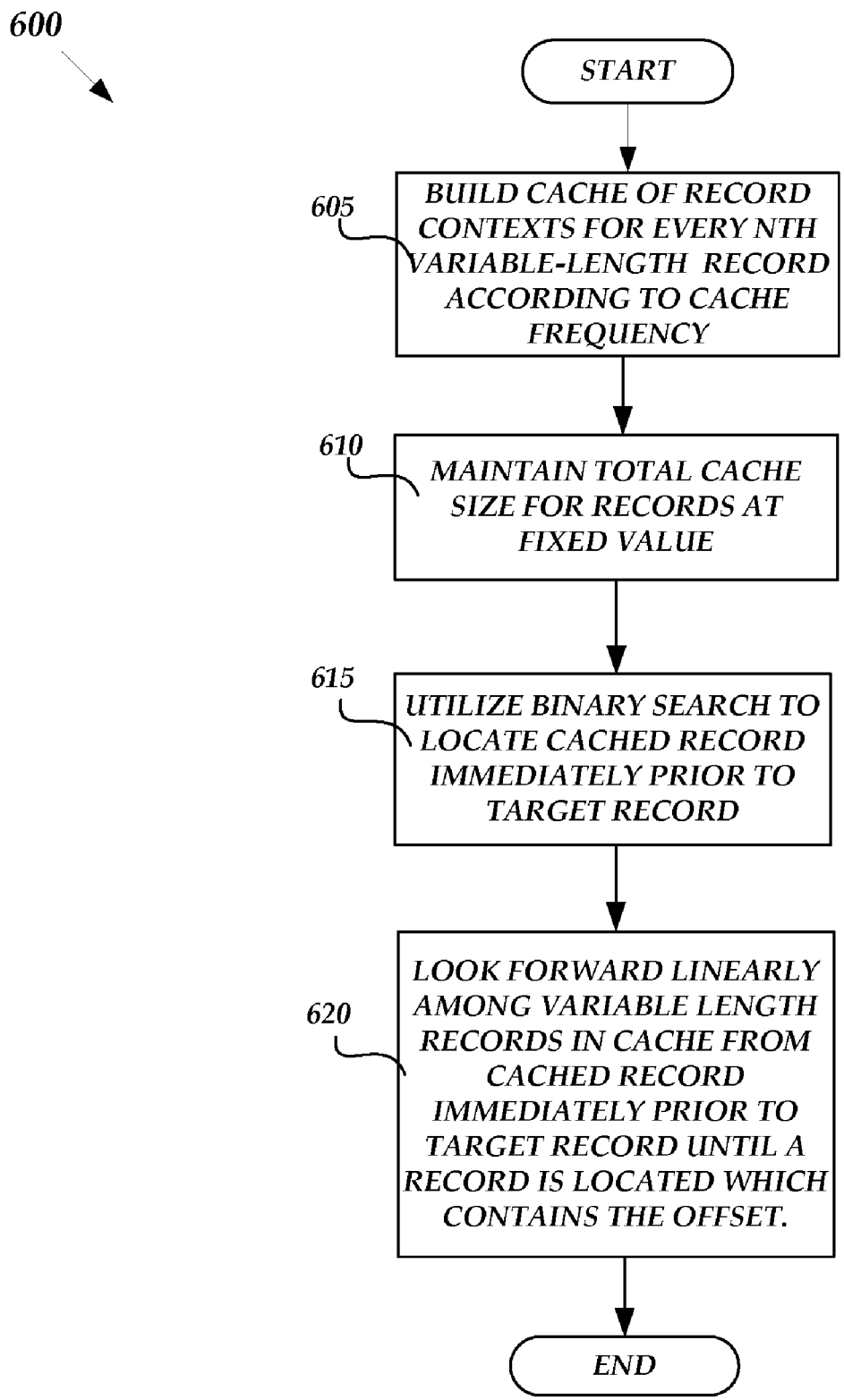
FIG. 6 is a flow diagram illustrating a routine for reducing a variable-length record list to a fixed length record list while accessing arbitrary record list items, in accordance with another embodiment.

FIG. 6 is a flow diagram illustrating a routine 600 for reducing a variable-length record list to a fixed length record list while accessing arbitrary record list items, in accordance with another embodiment. In particular, the routine 600 may be utilized to perform operations for looking up a target record of interest (in the cache 50) given an offset. The routine 600 begins at operation 605 where the application 30 executing on the computer 70 may be utilized to build a cache of record contexts for every Nth variable-length record (e.g., the records 52 in the cache 50) according to a cache frequency. It should be appreciated that the operation 605 may be implemented in a similar fashion as the operation 505 discussed above with respect to FIG. 5.

From operation 605, the routine 600 continues to operation 610 where the application 30 executing on the computer 70 maintains a total cache size (for records) for the cache built at operation 505, at a fixed value. In particular, the application 30 may build the cache 50 for every Nth record such that the total cache size remains constant (as shown in the illustrative computer program code discussed above at operation 505). It should be appreciated that the operation 610 may be implemented in a similar fashion as the operation 510 discussed above with respect to FIG. 5.

From operation 610, the routine 600 continues to operation 615 where the application 30 executing on the computer 70 utilizes a binary search to locate a cached record immediately prior to the target record of interest. In accordance with an embodiment, the binary search may be implemented by the following illustrative computer program code:

```
USHORT min = 0;
USHORT max = m_cCacheEntries − 1;
USHORT mid;
USHORT iFinal = 0;
while (min < max)
    {
    mid = min + (max − min) / 2;
    if (m_rgpaCache[mid].rec.pos.QuadPart > offset) // before mid
        {
        if (mid == 0) // before the first offset
            return false;
        max = mid − 1;
        }
    else if (m_rgpaCache[mid+1].rec.pos.QuadPart <= offset) // after mid+1
        {
        min = mid + 1;
        iFinal = max(iFinal, mid+1);
        }
    else
        {
        // exact match
        iFinal = mid;
        break;
        }
    }
```

From operation 615, the routine 600 continues to operation 620 where the application 30 executing on the computer 70 looks forward linearly among the variable-length records in the cache 50 from the cached record immediately prior to the target record (determined at operation 615) until a record is located which contains the offset. In particular, the application 30 may be configured to subsequently look forward linearly in a cache until a current record contains the offset. In accordance with an embodiment, the operation 620 may be implemented by the following illustrative computer program code:

```
// Maybe we need one of the cached records, and don't need to read
ahead.
if (m_rgpaCache[iFinal].rec.pos.QuadPart <= offset &&
m_rgpaCache[iFinal].cxt.pos.QuadPart > offset)
    {
    if (fMatchExact && m_rgpaCache[iFinal].rec.pos.QuadPart !=
    offset)
        return false;
    memcpy(&paRec, &m_rgpaCache[iFinal], sizeof(paRec));
    return true;
    }
// Read ahead
memcpy(&paRec, &m_rgpaCache[iFinal], sizeof(paRec));
while (paRec.cxt.pos.QuadPart <= offset &&
SUCCEEDED(HrReadRecord(paRec.rec, paRec.cxt)))
    {
    if (paRec.rec.pos.QuadPart <= offset &&
    paRec.cxt.pos.QuadPart > offset)
        return !fMatchExact || paRec.rec.pos.QuadPart == offset;
    }
// There is no record which matches.
Assert(false); return false;
```
From operation 620, the routine 600 then ends.

Although the invention has been described in connection with various illustrative embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A computer-implemented method of validating spreadsheet application workbook files, formatted according to a Binary Interchange File Format (BIFF), by sequentially accessing data records while allowing random data access within a sliding window, comprising:

(a) initializing, by the computer, a plurality of variables representing a plurality of records stored in a BIFF file, the plurality of records comprising the sliding window, the sliding window being utilized by a spreadsheet application to allow random data access when validating the BIFF file, the sliding window comprising a plurality of records comprising a a first record, a current record, a previous record with respect to the current record, a record which is two records prior to the current record, a next record with respect to the current record, and a plurality of subsequent records with respect to the current record, wherein the plurality of records are stored in an array comprising:
//m_rgRec[0] is always the first record of a list;
//m_rgRec[1] is always two records ago;
//m_rgRec[2] is always the previous record;
//m_rgRec[3] is always the current record;
//m_rgRec[4] is the next record; and
PosAll m?rgRec[5];

(b) reading, by the computer, the current record from the BIFF file, the current record from the BIFF file being read by:
calling a record access function to receive context information associated with the current record; and
calling the function to read the current record based on the context information, the context information comprising at least some context information that is not contained within the BIFF file, the at least some context information being inferred from the BIFF file, the inferred context information comprising information from correlating groups of records and a computed position of the next record to be read from the BIFF file;

(c) copying, by the computer, the current record to the first record for validation;

(d) copying, by the computer, the current record to the previous record and the next record to the current record for validation;

(e) determining, by the computer, whether all of the plurality of records in the BIFF file have been validated;

(f) determining, by the computer, whether another record is present in the BIFF file upon determining that all of the plurality of records in the BIFF file have not been validated;

(g) reading, by the computer, the another record into the next record upon determining that the another record is present in the BIFF file;

(h) validating, by the computer, a type, size, and position associated with the current record in the BIFF file;

(i) copying, by the computer, the previous record to the record which is two records prior to the current record; and (j) repeating, by the computer, the operations (d)-(i) for each of the plurality of records in the BIFF file.

2. The method of claim 1, further comprising validating the current record upon determining that the another record is not present in the file.

3. The method of claim 1, further comprising:
calling the function to update the context information; and
calling the function to read the next record based on the context information.

4. A computer system for validating files formatted according to a Binary Interchange File Format (BIFF) by sequentially accessing data records while allowing random data access within a sliding window, comprising:

a memory for storing executable program code; and a processor, functionally coupled to the memory, the processor being responsive to computer-executable instructions contained in the program code and wherein the processor:

(a) initializes a plurality of variables representing a plurality of records stored in a BIFF file, the plurality of records comprising the sliding window, the sliding window being utilized to allow random data access when validating the BIFF file, the sliding window comprising a first record, a current record, a previous record with respect to the current record, a record which is two records prior to the current record, a next record with respect to the current record, and a plurality of subsequent records with respect to the current record, wherein the plurality of records are stored in an array;

(b) calls a record access function to receive context information associated with the current record call the function to read the current record based on the context information, the context information comprising at least some context information that is not contained within the BIFF file, the at least some context information being inferred from the BIFF file, the inferred context information comprising information from correlating groups of records and a computed position of the next record to be read from the BIFF file;

(c) copies the current record to the first record for validation;

(d) copies the current record to the previous record and the next record to the current record for validation;

(e) determines whether all of the plurality of records in the file have been validated;

(f) determines whether another record is present in the BIFF file upon determining that all of the plurality of records in the BIFF file have not been validated;

(g) reads the another record into the next record upon determining that the another record is present in the BIFF file;

(h) validates a type, size, and position associated with the current record in the BIFF file;

(i) copies the previous record to the record which is two records prior to the current record; and (j) repeats the operations (d)-(i) for each of the plurality of records in the BIFF file.

5. The system of claim 4, wherein the processor further validates the current record upon determining that the another record is not present in the file.

6. The system of claim 4, wherein the processor further:
calls the function to update the context information; and
calls the function to read the next record based on the context information.

7. A computer-readable storage, medium device comprising computer-executable instructions which, when executed by a computer, will cause the computer to perform a method of validating files, stored on the computer readable medium, and formatted according to a Binary Interchange File Format (BIFF) by sequentially accessing data records while allowing random data access within a sliding window, the method comprising:

(a) initializing a plurality of variables representing a plurality of records stored in a BIFF file, the plurality of records comprising the sliding window, the sliding window being utilized to allow random data access when validating the BIFF File, the sliding window comprising at least a first record, a current record, a previous record with respect to the current record, a record which is two records prior to the current record, a next record with respect to the current record, and a plurality of subsequent records with respect to the an4—a record which is two records prior to the current record, wherein the plurality of records are stored in an array;

(b) reading the current record from the BIFF file by calling a function to receive context information associated with the current record and by calling the function to read the current record based on the context information, the context information comprising at least some context information that is not contained within the BIFF file, the at least some context information being inferred from the BIFF file, the inferred context information comprising information from correlating groups of records and a computed position of the next record to be read from the BIFF file;

(c) copying the current record to the first record for validation;

(d) copying the current record to the previous record and the next record to the current record for validation;

(e) determining whether all of the plurality of records in the BIFF file have been validated;

(f) determining whether another record is present in the BIFF file upon determining that all of the plurality of records in the BIFF file have not been validated;

(g) reading the another record into the next record upon determining that the another record is present in the BIFF file;

(h) validating the current record, wherein validating the current record comprises validating at least one of a type, a size, and a position associated with the current record in the BIFF file;

(i) copying the previous record to the record which is two records prior to the current record; and (j) repeating the operations (d)-(i) for each of the plurality of records in the BIFF file.

8. The computer-readable storage device of claim 7, further comprising validating the current record upon determining that the another record is not present in the file.

9. The computer-readable storage device of claim 7, further comprising:

calling the function to update the context information; and calling the function to read the next record based on the context information.

\* \* \* \* \*